US008953933B2

(12) United States Patent
Ohtomo et al.

(10) Patent No.: US 8,953,933 B2
(45) Date of Patent: Feb. 10, 2015

(54) AERIAL PHOTOGRAMMETRY AND AERIAL PHOTOGRAMMETRIC SYSTEM

(71) Applicant: Kabushiki Kaisha TOPCON, Itabashi-ku, Tokyo-to (JP)

(72) Inventors: Fumio Ohtomo, Asaka (JP); Hitoshi Otani, Tokyo-to (JP); Kazuki Osaragi, Tokyo-to (JP); Tetsuji Anai, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 0 days.

(21) Appl. No.: 14/059,784

(22) Filed: Oct. 22, 2013

(65) Prior Publication Data

US 2014/0119716 A1     May 1, 2014

(30) Foreign Application Priority Data

Oct. 31, 2012    (JP) .................................. 2012-240492

(51) Int. Cl.
   *G03B 39/00*        (2006.01)
   *G01C 11/00*        (2006.01)
   *G01C 11/02*        (2006.01)

(52) U.S. Cl.
   CPC .............. *G01C 11/00* (2013.01); *G01C 11/025* (2013.01)
   USPC .................. 396/8; 396/427; 348/144; 701/28; 244/190

(58) Field of Classification Search
   USPC ............. 396/7, 8, 427; 348/143–147; 701/28; 244/190
See application file for complete search history.

(56) References Cited

U.S. PATENT DOCUMENTS

| 4,005,818 A | * | 2/1977 | Krause et al. ................. 375/362 |
| 4,359,733 A | * | 11/1982 | O'Neill ........................... 342/36 |
| 4,404,553 A | | 9/1983 | Cuffia |

(Continued)

FOREIGN PATENT DOCUMENTS

| JP | 5-24589 A | 2/1993 |
| JP | 8-159762 A | 6/1996 |

(Continued)

OTHER PUBLICATIONS

Extended European Search Report mailed May 23, 2013 in co-pending European patent application No. EP 12165456.

(Continued)

*Primary Examiner* — Clayton E Laballe
*Assistant Examiner* — Warren K Fenwick
(74) *Attorney, Agent, or Firm* — Nields, Lemack & Frame, LLC (57) ABSTRACT

Aerial photogrammetry is provided by using two or more flying vehicles, each equipped with a GPS device and an image pickup unit. This method comprises setting up two or more photographing points and setting up a photographing point area, respectively, with each of the photographing points as the center, measuring a position of the flying vehicle by the GPS device, a step where each of the flying vehicle reaches each corresponding photographing point area and maintains the position of the photographing point area, acquiring a time when the flying vehicle finally reaches the photographing point area, setting up a shutter timing time after a predetermined time from the moment when the flying vehicle has finally reached the photographing point area, and taking aerial photographs by the two or more flying vehicles at the shutter timing time.

9 Claims, 9 Drawing Sheets

(56) References Cited

U.S. PATENT DOCUMENTS

| | | | |
|---|---|---|---|
| 4,490,028 A * | 12/1984 | Kucher | 396/8 |
| 5,235,513 A | 8/1993 | Velger et al. | |
| 5,490,075 A | 2/1996 | Howard et al. | |
| 5,559,510 A | 9/1996 | Strong, III et al. | |
| 5,986,581 A | 11/1999 | Magdaleno, II et al. | |
| 6,006,158 A | 12/1999 | Pilley et al. | |
| 6,084,510 A * | 7/2000 | Lemelson et al. | 340/539.13 |
| 6,193,190 B1 | 2/2001 | Nance | |
| 6,405,975 B1 | 6/2002 | Sankrithi et al. | |
| 6,608,559 B1 * | 8/2003 | Lemelson et al. | 340/539.13 |
| 6,626,078 B2 | 9/2003 | Thornton | |
| 6,995,792 B1 * | 2/2006 | Ogura | 348/231.99 |
| 7,010,401 B1 | 3/2006 | Richburg et al. | |
| 7,391,340 B2 | 6/2008 | Malhomme | |
| 7,552,025 B2 | 6/2009 | Ohtomo et al. | |
| 7,590,484 B2 | 9/2009 | Gellert | |
| 7,666,682 B2 | 2/2010 | Armentrout et al. | |
| 7,671,998 B2 * | 3/2010 | Ohtomo et al. | 356/601 |
| 7,725,257 B2 | 5/2010 | Strelow et al. | |
| 7,726,033 B2 * | 6/2010 | Ohtomo et al. | 33/275 R |
| 7,755,513 B2 | 7/2010 | Wang et al. | |
| 7,804,996 B2 | 9/2010 | Ohtomo et al. | |
| 8,078,349 B1 | 12/2011 | Prada Gomez et al. | |
| 8,218,131 B2 | 7/2012 | Otani et al. | |
| 8,422,777 B2 | 4/2013 | Aller | |
| 8,422,825 B1 | 4/2013 | Neophytou et al. | |
| 8,589,071 B2 | 11/2013 | Feyereisen et al. | |
| 8,630,755 B2 | 1/2014 | Ohtomo et al. | |
| 8,666,571 B2 | 3/2014 | Ohtomo et al. | |
| 2002/0085094 A1 * | 7/2002 | Teuchert | 348/144 |
| 2002/0089588 A1 * | 7/2002 | LeCompte | 348/144 |
| 2004/0041999 A1 * | 3/2004 | Hogan et al. | 356/141.5 |
| 2005/0084975 A1 | 4/2005 | Armentrout et al. | |
| 2005/0125142 A1 | 6/2005 | Yamane | |
| 2005/0165517 A1 | 7/2005 | Reich | |
| 2005/0286760 A1 | 12/2005 | Ohtomo et al. | |
| 2006/0239539 A1 | 10/2006 | Kochi et al. | |
| 2007/0093945 A1 * | 4/2007 | Grzywna et al. | 701/23 |
| 2008/0059065 A1 | 3/2008 | Strelow et al. | |
| 2008/0071431 A1 | 3/2008 | Dockter et al. | |
| 2008/0075325 A1 * | 3/2008 | Otani et al. | 382/106 |
| 2008/0111815 A1 | 5/2008 | Graves et al. | |
| 2008/0298638 A1 | 12/2008 | Miyazaki | |
| 2009/0015685 A1 | 1/2009 | Shulman | |
| 2009/0087029 A1 * | 4/2009 | Coleman et al. | 382/103 |
| 2009/0122133 A1 * | 5/2009 | Hartman | 348/42 |
| 2009/0306840 A1 * | 12/2009 | Blenkhorn et al. | 701/16 |
| 2010/0013927 A1 | 1/2010 | Nixon | |
| 2010/0033371 A1 | 2/2010 | Kumagai et al. | |
| 2010/0070111 A1 * | 3/2010 | Akcasu | 701/3 |
| 2011/0049290 A1 * | 3/2011 | Seydoux et al. | 244/17.13 |
| 2011/0196598 A1 | 8/2011 | Feyereisen et al. | |
| 2011/0307126 A1 | 12/2011 | Hogstrom | |
| 2012/0007982 A1 * | 1/2012 | Giuffrida et al. | 348/144 |
| 2012/0078451 A1 | 3/2012 | Ohtomo et al. | |
| 2012/0173053 A1 * | 7/2012 | Ohtomo et al. | 701/4 |
| 2012/0215388 A1 | 8/2012 | Pepitone et al. | |
| 2012/0261516 A1 | 10/2012 | Gilliland et al. | |
| 2012/0277934 A1 | 11/2012 | Ohtomo et al. | |
| 2012/0300070 A1 | 11/2012 | Ohtomo et al. | |
| 2013/0062457 A1 | 3/2013 | Deakin | |
| 2013/0135440 A1 | 5/2013 | Ohtomo et al. | |
| 2013/0142500 A1 * | 6/2013 | Yavin | 396/7 |
| 2014/0055613 A1 * | 2/2014 | Ohtomo et al. | 348/144 |

FOREIGN PATENT DOCUMENTS

| | | |
|---|---|---|
| JP | 8-285588 A | 11/1996 |
| JP | 2662111 B2 | 10/1997 |
| JP | 9-302628 A | 11/1997 |
| JP | 2000-85694 A | 3/2000 |
| JP | 2001-39397 A | 2/2001 |
| JP | 2004-245741 A | 9/2004 |
| JP | 2005-115623 A | 4/2005 |
| JP | 2006-10376 A | 1/2006 |
| JP | 2006-500266 A | 1/2006 |
| JP | 3808833 B2 | 8/2006 |
| JP | 2007-171048 A | 7/2007 |
| JP | 2008-76303 A | 4/2008 |
| JP | 4253239 B2 | 4/2009 |
| JP | 2010-38822 A | 2/2010 |
| JP | 2011-86895 A | 4/2011 |
| JP | 2011-89895 A | 5/2011 |
| JP | 2012-71645 A | 4/2012 |
| JP | 2012-140101 A | 7/2012 |
| JP | 2012-232654 A | 11/2012 |
| JP | 2012-242321 A | 12/2012 |
| JP | 2013-108927 A | 6/2013 |
| WO | 2004/027434 A1 | 4/2004 |

OTHER PUBLICATIONS

Office Action mailed Jul. 16, 2013 in co-pending U.S. Appl. No. 13/453,242.
Final Rejection mailed Feb. 11, 2014 in co-pending U.S. Appl. No. 13/453,242.
Office Action mailed Jul. 2, 2014 in co-pending U.S. Appl. No. 13/453,242.
Office Action mailed Aug. 12, 2014 in co-pending U.S. Appl. No. 13/473,659.

* cited by examiner

SYNCHRONIZED
PHOTOGRAPHING

FIG.8B

NON-SYNCHRONIZED
PHOTOGRAPHING

FIG.9

FIG.10 ic photogrammetry is performed by using the UAV.
AERIAL PHOTOGRAMMETRY AND AERIAL PHOTOGRAMMETRIC SYSTEM

BACKGROUND OF THE INVENTION

The present invention relates to an aerial photogrammetry and an aerial photogrammetric system, using a small type flying vehicle equipped with a camera for photogrammetry on board.

In recent years, with the progress of UAV (Unmanned Air Vehicle), a camera for photogrammetry is installed on UAV and aerial photogrammetry is performed by using the UAV.

In a case where aerial photogrammetry is performed, photographs are taken while flying at an altitude as required at two points so that an object to be measured or a region to be measured is included, relative orientation is performed on images photographed at the two points, and photogrammetry is carried out by performing absolute orientation of the images based on known points (points having a geocentric coordinate already known).

Normally, in aerial photogrammetry, an object and an object to be measured included in an image may be regarded as standstill objects. Therefore, in a case where a flying vehicle is moved for a predetermined time after taking a photograph at a first point and then takes a photograph at a second point, there is no problem in considering that there is no change in the condition of an object or an object to be measured due to the difference in time acquisition between the image acquired at the first point and the image acquired at the second point.

Accordingly, there is no problem even if relative orientation is performed based on the two images which have been photographed at two points respectively, i.e. two images acquired with time difference as necessary. Further, no influence is exerted on relative orientation even when a base line length is increased to improve the accuracy.

In contrast, there are such cases where a detailed image of constructions or a growing condition of agricultural products is observed and measurement is performed by photogrammetry. In particular, in order to observe growing conditions and measure the growth of agricultural products, photographs taken at lower altitude is necessary to observe the conditions of leaves or stems and of measuring height of growth and the like.

When photographs are taken on agricultural products at a low altitude, conditional changes over time such as movings of leaves and stems caused by wind may appear conspicuously on the images taken. Further, there are cases where a moving object such as an automobile may be photographed and included in the images taken to a considerable extent. In cases where there is a difference in the images acquired, the accuracy of the relative orientation is decreased, and the relative orientation may not be accomplished in some cases.

For this reason, it is desirable that there is no time difference or there is almost no time difference between the image acquired at the first point and the image acquired at the second point. However, in a case where the time difference between the image acquired at the first point and the image acquired at the second point is decreased, a moving distance is shortened, the base line length is shortened, and cause the problem of a decrease in the measurement accuracy.

SUMMARY OF THE INVENTION

It is an object of the present invention to improve measurement accuracy by aerial photogrammetry.

To attain the object, an aerial photogrammetry according to the present invention provides an aerial photogrammetry by using two or more flying vehicles each equipped with a GPS device and an image pickup unit, comprising a step of setting up two or more photographing points and of setting up a photographing point area respectively with each of the photographing points as the center, a step of measuring a position of the flying vehicle by the GPS device, a step where each of the flying vehicle reaches each corresponding photographing point area and maintains the position of the photographing point area, a step of acquiring a time when the flying vehicle finally reaches the photographing point area, a step of setting up a shutter timing time after a predetermined time from the moment when the flying vehicle has finally reached the photographing point area, and a step of taking aerial photographs by the two or more flying vehicles at the shutter timing time.

Further, in an aerial photogrammetry according to the present invention, a base control device is installed on ground surface side, the two or more flying vehicles determine whether the two or more flying vehicles have reached within the photographing point area based on positions of the two or more flying vehicles as measured by the GPS device, a reaching time is acquired by the GPS device, a GPS time as acquired is transmitted to the base control device, the base control device calculates a shutter timing time according to the GPS time finally received from the two or more flying vehicles, and in a case where the GPS time acquired by the GPS device coincides with the shutter timing time, an aerial photograph is taken by the two or more flying vehicles.

Further, in an aerial photogrammetry according to the present invention, a distance between the photographing points is ⅓ or more of an altitude, and the photographing point is set up so that overlapping ratio between the images taken will be 60% or more at the altitude.

Further, in an aerial photogrammetry according to the present invention, the two or more flying vehicles take still images while flying along a flight course as set up for each of the flying vehicles, two or more photographing points are set up along the flight course, a distance between the photographing points is set so that still images acquired at each of the photographing points will be at least 30% of a sidelap, a 3D model prepared is connected by tie points extracted by side-lapping, and a wide-area 3D model is prepared.

Further, an aerial photogrammetric system according to the present invention comprises two or more flying vehicles each equipped with an image pickup unit, a GPS device, a flying vehicle control device, and a base control device which is installed on ground surface side for setting up photographing points of the two or more flying vehicles at a predetermined distance and for setting photographing points area with the photographing point as the center, wherein the flying vehicle control device makes the flying vehicles fly in the photographing point area based on the position of the flying vehicle measured by the GPS device, maintains the flying vehicles within the photographing point area in a case where the photographing point area is reached, further, transmits time of the GPS device to the base control device, the base control device judges a time point of when the positions of the two or more flying vehicles are finally within the photographing point area in a case where positions of the two or more flying vehicles area are within the photographing point area, transmits a time after elapse of a predetermined time from the time point to each of the flying vehicle control devices as a shutter timing time, and the image pickup unit takes images at the shutter timing time.

Further, in an aerial photogrammetric system according to the present invention, the flying vehicle control device transmits position information and GPS time as acquired by the GPS device to the base control device, the base control device determines the GPS time of when the last of the two or more flying vehicles reaches the photographing point area based on the positional information and the GPS time, transmits a time after predetermined time from the GPS time as the shutter timing time to the flying vehicle control device, and the flying vehicle control device makes the image pickup unit to carry out taking images when the GPS time obtained from the GPS device coincides with the shutter timing time.

Furthermore, in an aerial photogrammetric system according to the present invention, the flying vehicle control device makes each of the flying vehicles fly along a flight course as set up for each of the flying vehicles, a predetermined number of photographing points are set up on each of the flight courses, and in a case where still images are acquired at corresponding photographing points on each of the flight courses, the flying vehicle control device makes the image pickup unit take images at the shutter timing time.

According to the present invention, in an aerial photogrammetry by using two or more flying vehicles each equipped with a GPS device and an image pickup unit, comprising a step of setting up two or more photographing points and of setting up a photographing point area respectively with each of the photographing points as the center, a step of measuring a position of the flying vehicle by the GPS device, a step where each of the flying vehicle reaches each corresponding photographing point area and maintains the position of the photographing point area, a step of acquiring a time when the flying vehicle finally reaches the photographing point area, a step of setting up a shutter timing time after a predetermined time from the moment when the flying vehicle has finally reached the photographing point area, and a step of taking aerial photographs by the two or more flying vehicles at the shutter timing time. As a result, even when there is a deviation between the flights of a plurality of flying vehicles, i.e. even when a perfect synchronized flight is not carried out, photographing of the objects can be accomplished at the same time.

Further, according to the present invention, in an aerial photogrammetry, a base control device is installed on ground surface side, the two or more flying vehicles determine whether the two or more flying vehicles have reached within the photographing point area based on positions of the two or more flying vehicles as measured by the GPS device, a reaching time is acquired by the GPS device, a GPS time as acquired is transmitted to the base control device, the base control device calculates a shutter timing time according to the GPS time finally received from the two or more flying vehicles, and in a case where the GPS time acquired by the GPS device coincides with the shutter timing time, an aerial photograph is taken by the two or more flying vehicles. As a result, a plurality of flying vehicles can be controlled at the common time, and a perfect synchronized photographing becomes possible without giving consideration on individual differences of the flying vehicles.

Further, according to the present invention, in an aerial photogrammetry, a distance between the photographing points is ⅓ or more of an altitude, and the photographing point is set so that overlapping ratio between the images taken will be 60% or more at the altitude. As a result, high measurement accuracy can be maintained and combining of the images with high accuracy becomes possible.

Further, according to the present invention, in an aerial photogrammetry, the two or more flying vehicles take still images while flying along a flight course as set up for each of the flying vehicles, two or more photographing points are set up along the flight course, a distance between the photographing points is set so that still images acquired at each of the photographing points will be at least 30% of a sidelap, a 3D model prepared is connected by tie points extracted by sidelapping, and a wide-area 3D model is prepared. As a result, the preparation of 3D models of the objects to be measured in a wide range exceeding the field angle of the image pickup unit becomes possible.

Further, according to the present invention, an aerial photogrammetric system comprises two or more flying vehicles each equipped with an image pickup unit, a GPS device, a flying vehicle control device, and a base control device which is installed on ground surface side for setting up photographing points of the two or more flying vehicles at a predetermined distance and for setting photographing points area with the photographing point as the center, wherein the flying vehicle control device makes the flying vehicles fly in the photographing point area based on the position of the flying vehicle measured by the GPS device, maintains the flying vehicles within the photographing point area in a case where the photographing point area is reached, further, transmits time of the GPS device to the base control device, the base control device judges a time point of when the positions of the two or more flying vehicles are finally within the photographing point area in a case where positions of the two or more flying vehicles area are within the photographing point area, transmits a time after elapse of a predetermined time from the time point to each of the flying vehicle control devices as a shutter timing time, and the image pickup unit takes images at the shutter timing time. As a result, even when there is a deviation between the flights of a plurality of flying vehicles, i.e. even when a perfect synchronized flight is not carried out, photographing of the objects can be accomplished at the same time.

Further, according to the present invention, in an aerial photogrammetric system, the flying vehicle control device transmits position information and GPS time as acquired by the GPS device to the base control device, the base control device determines the GPS time of when the last of the two or more flying vehicles reaches the photographing point area based on the positional information and the GPS time, transmits a time after predetermined time from the GPS time as the shutter timing time to the flying vehicle control device, and the flying vehicle control device makes the image pickup unit to carry out taking images when the GPS time obtained from the GPS device coincides with the shutter timing time. As a result, a plurality of flying vehicles can be controlled at the common time, and a perfectly synchronized photographing becomes possible without giving consideration on individual differences of the flying vehicles.

Furthermore, according to the present invention, in an aerial photogrammetric system, the flying vehicle control device makes each of the flying vehicles fly along a flight course as set up for each of the flying vehicles, a predetermined number of photographing points are set up on each of the flight courses, and in a case where still images are acquired at corresponding photographing points on each of the flight courses, the flying vehicle control device makes the image pickup unit take images at the shutter timing time. As a result, even when there is a deviation between the flights of a plurality of flying vehicles, i.e. even when a perfect synchronized flight is not carried out, photographing of the objects can be accomplished at the same time, and in the flight control of the flying vehicle, an accuracy will be unnecessary.

BRIEF DESCRIPTION OF THE DRAWINGS

FIG. 8A and FIG. 8B each represents a drawing to explain images in conditions where photographing is performed from two flying vehicles.

DETAILED DESCRIPTION OF THE PREFERRED EMBODIMENT

Description will be given below on an embodiment of the present invention by referring to the attached drawings.

Figure 1:
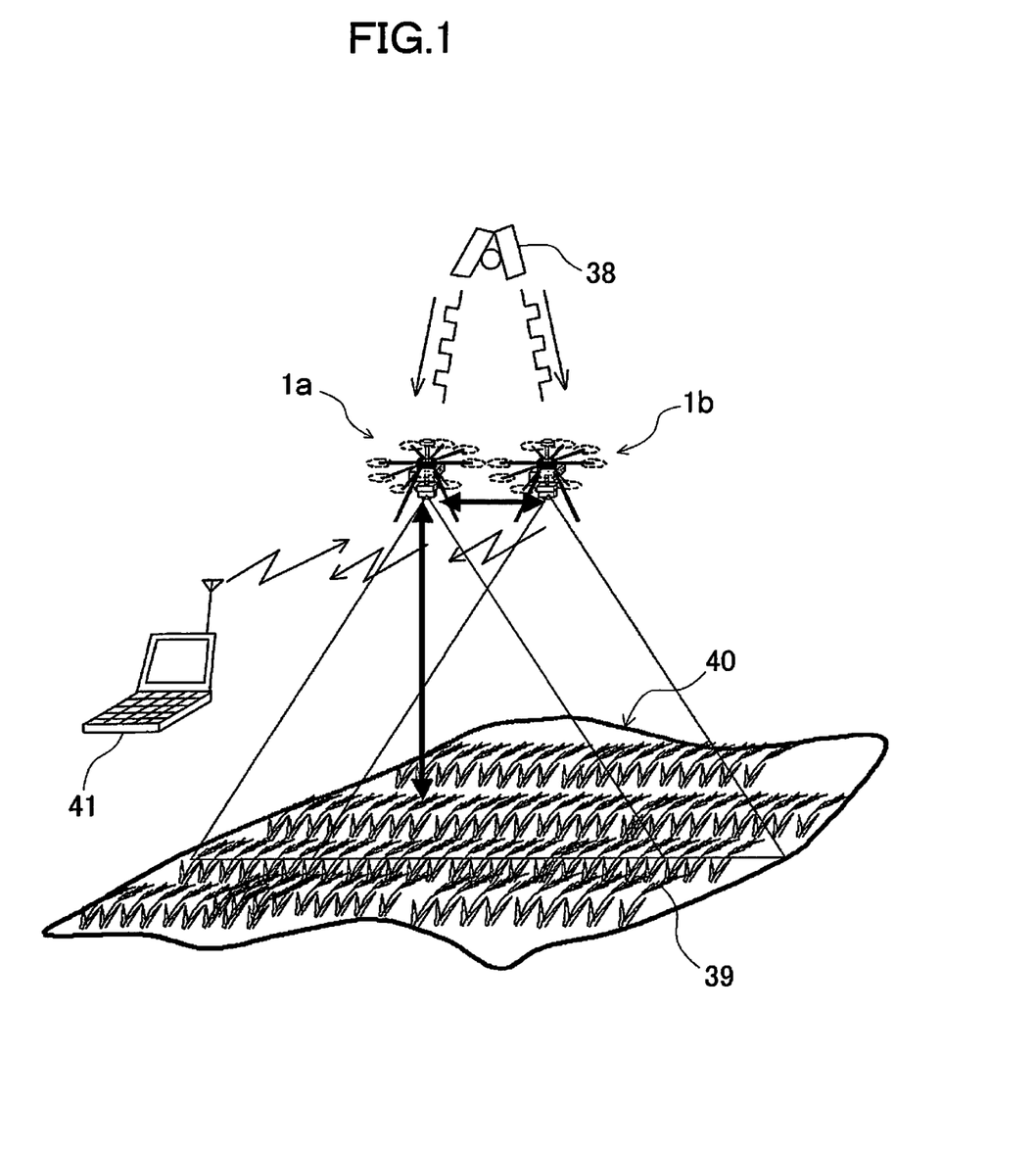
FIG. 1 is a perspective view to show the schematics of an aerial photogrammetric system according to an embodiment of the present invention.

FIG. 1 shows a basic arrangement of an aerial photogrammetric system according to the present embodiment.

The aerial photogrammetric system primarily comprises two unmanned aerial vehicles (UAV's) 1a and 1b where cameras for photogrammetry are installed (hereinafter, it is referred as merely "UAV 1" if UAV 1a and UAV 1b is not distinguished from each other), and a base control device 41 installed on the ground surface. It is to be noted that, in the present embodiment, a small type helicopter is used as the UAV 1.

Further, in FIG. 1, reference numeral 38 represents a satellite, which issues a signal for position measurement to a GPS, and reference numeral 39 represents agricultural products, which are objects to be measured. Further, a range including the object to be measured 39 in a predetermined range is set as a range to be measured 40.

Figure 2:
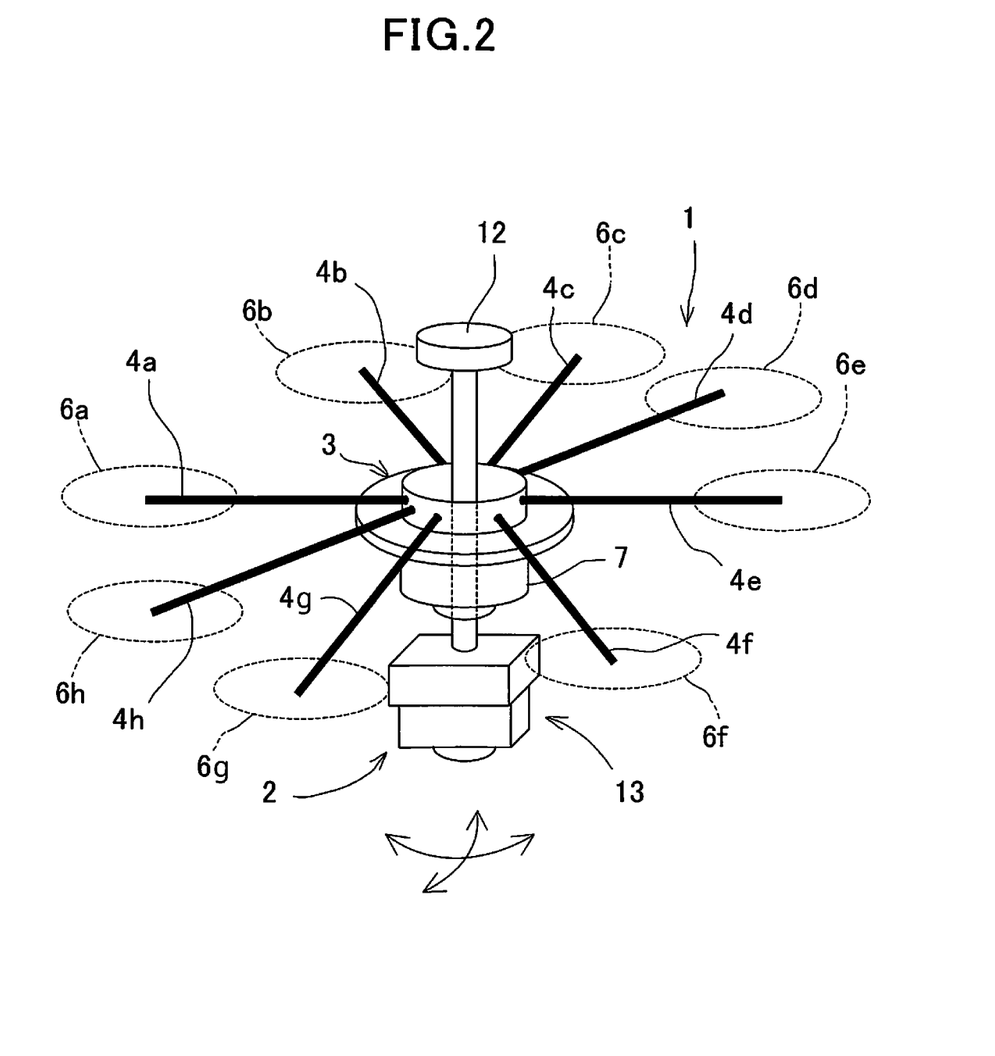
FIG. 2 is a perspective view to show the schematics of an aerial photographing device according to the embodiment of the present invention.

First, referring to FIG. 2 to FIG. 4, description will be given below on the UAV 1.

The UAV 1 has a vehicle body 3, the vehicle body 3 has a plurality of and even numbers of propeller frames 4 extending in radial direction, and a propeller unit is mounted on a forward end of each of the propeller frames 4. The propeller unit comprises a propeller motor 5 mounted on a forward end of the propeller frame 4 and a propeller 6 mounted on an output shaft of the propeller motor 5. The propeller 6 is rotated by the propeller motor 5 so that the UAV 1 can fly.

The vehicle body 3 has a main frame 7 in hollow and cylindrical shape at its center. On an upper end of the main frame 7, an outer flange 8 extending in an outward direction is provided, and on a lower end of the main frame 7, an inner flange 9 extending toward the center is provided. At the central portion of the inner flange 9, a circular hole 10 is formed.

The propeller frame 4 is designed in form of a rod, installed within a plane, which perpendicularly crosses the axis of the main frame 7, and a predetermined number of propeller frames (at least 4 propeller frames, preferably 8 propeller frames; in the figure, 8 propeller frames (4a to 4h) are shown) are provided in a horizontal direction and with an equal angular interval. Internal end portion of the propeller frame 4 penetrates the main frame 7 and is fixed on the outer flange 8.

A camera for photogrammetry 2 which acquires digital images is installed so as to penetrate the main frame 7 in up-and-down direction. The camera for photogrammetry 2 is designed to be freely movable in any direction with respect to the main frame 7.

The camera for photogrammetry 2 has a shaft 11 extending in up-and-down direction, a GPS antenna 12 installed on an upper end of the shaft 11, and a photographing device 13 installed on a lower end of the shaft 11.

The shaft 11 penetrates the hole 10, and an axis of the shaft 11 is concentric with an axis of the main frame 7. Near the lower end of the shaft 11, a gimbal 14 is provided, and the gimbal 14 is installed on the inner flange 9 via a vibration-proof member 15.

The gimbal 14 has swing shafts 16a and 16b extending in two directions and crossing perpendicularly to each other, and these swing shafts movably support the shaft 11 in two directions perpendicularly crossing each other. The vibration-proof member 15 absorbs vibration when the propeller motor 5 and the propellers 6 are rotated and is designed so that the vibration will not be transferred to the shaft 11.

The photographing device 13 fulfills a function as a balance weight, and when no external force is applied on the photographing device 13, the shaft 11 is maintained at a vertical position.

Between the propeller frame 4 and the shaft 11, a damper spring 17 is stretched over. At least three pieces, or more preferably, 4 pieces of damper springs 17 are provided. It is preferable that the damper springs 17 are provided between the propeller frames 4 extending in parallel to each of the movable shafts 16a and 16b and the shaft 11.

Further, each of the four pieces of the damper springs 17 applies tensile forces between the shaft 11 and the propeller frame 4 respectively and set so that the shaft 11 can maintain a vertical condition by a balance of tensile force when the UAV 1 is in a horizontal posture (a condition where the propeller frame 4 are in horizontal position). Further, tensile force and spring constant of the damper spring 17 are set to smaller values, and in a case where the vehicle body 3 is tilted, the shaft 11 is designed so as to be directed in vertical direction due to gravity applied on the photographing device 13.

Figure 3:
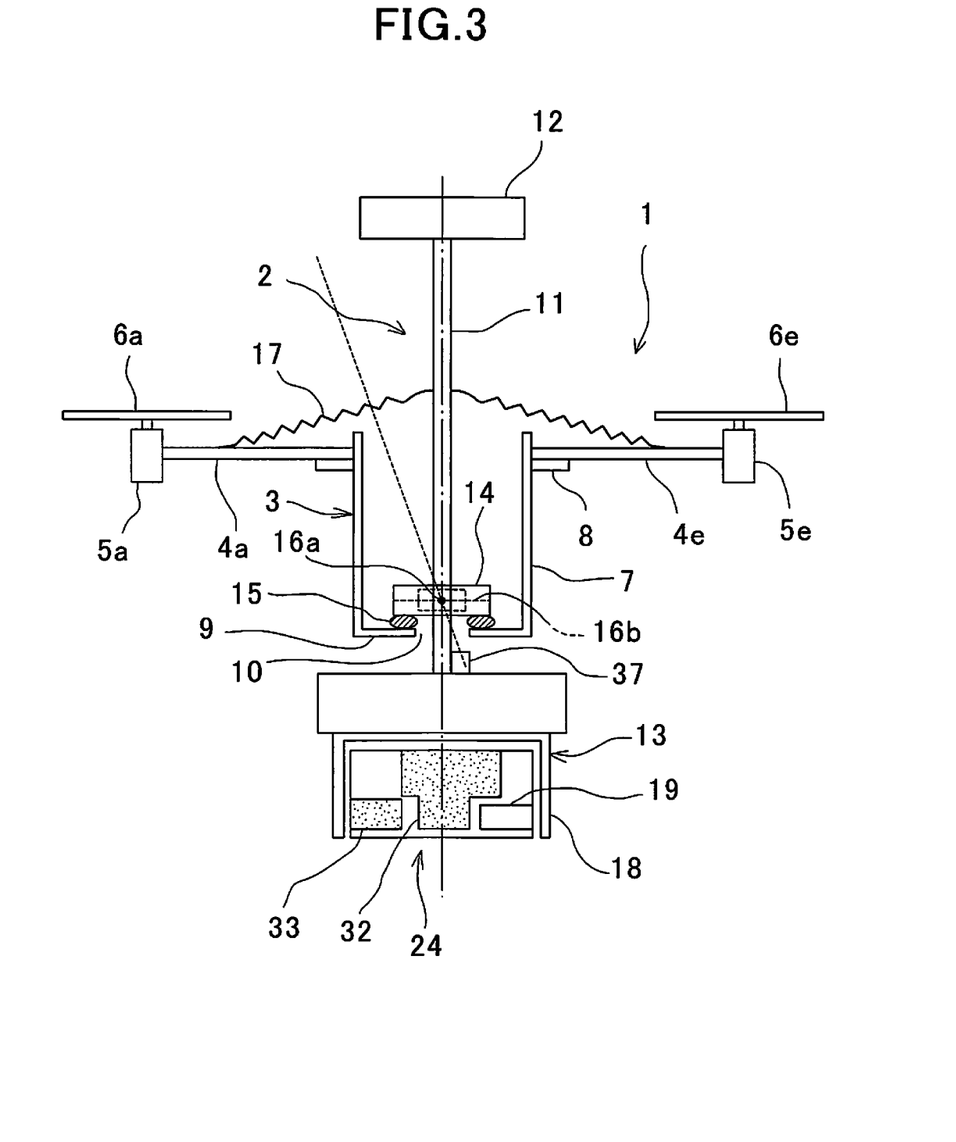
FIG. 3 is a schematical cross-sectional view of the aerial photographing device.
Figure 4:
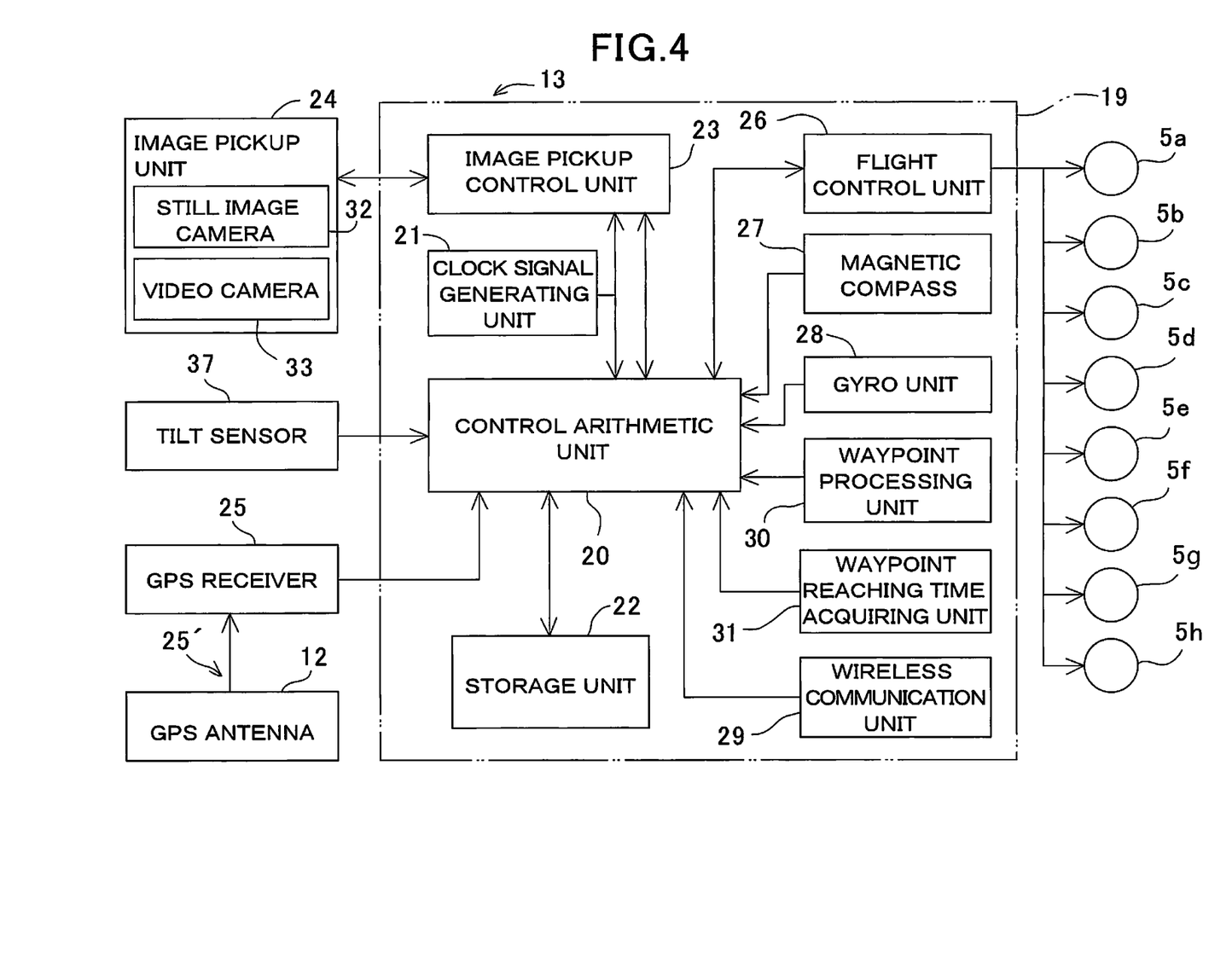
FIG. 4 is a block diagram to show a schematical arrangement of the aerial photographing device.

A tilt sensor 37 is provided at a position as required on the camera for photogrammetry 2, e.g. on a lower end of the shaft 11 as shown in FIG. 3. When the shaft 11 is tilted with respect to the vertical line, the tilt sensor 37 detects an angle between the vertical line and the axis of the shaft 11. For instance, a sudden tilting of the gimbal 14 caused by the change of acceleration of the vehicle body 3 is detected. The detection result of the tilt sensor 37 is sent to a control device 19 as to be described later.

It is to be noted that, the damper spring 17 is a biasing means for biasing the shaft 11 to vertical condition. When the shaft 11 is moved or vibrated, the damper spring 17 promptly returns the shaft 11 in vertical condition and makes vibration attenuated. Further, as the biasing means, a torsion coil spring may be used for rotating the movable shafts 16a and 16b in a returning direction when the movable shafts 16a and 16b of the gimbal 14 are rotated.

Now, description will be given on the schematics of the photographing device 13 by referring to FIG. 4.

The photographic device 13 has a casing 18 mounted on a lower end of the shaft 11, and a control device 19, an image pickup unit 24, and a GPS receiver 25 are accommodated inside the casing 18.

Also, the control device 19 primarily comprises a control arithmetic unit 20, a clock signal generating unit 21, a storage unit 22, an image pickup control unit 23, a flight control unit 26, a magnetic compass 27, a gyro unit 28, a wireless communication unit 29, a waypoint processing unit 30, and a waypoint reaching time acquiring unit 31. Further, the image pickup unit 24 has a still image camera 32 and a video camera 33.

The still image camera 32 is a digital camera, and the video camera 33 is a digital video camera, and both the cameras output digital image data as image data.

It is to be noted that different cameras may be used as the still image camera 32 and the video camera 33. Or, the video camera 33 may use the optical system of the still image camera 32 in common, and the video camera 33 may be designed so that the video camera continuously acquire still images obtained via the optical system.

An optical axis of the still image camera 32 and an optical axis of the video camera 33 are set in parallel to the axis of the shaft 11 respectively, and optical axis of the still image camera 32 and video camera are always maintained in vertical direction regardless of the posture of the UAV 1. Further, the relation between the optical axis of the still image camera 32 and the optical axis of the video camera 33 is already known. Preferably, the axis of the shaft 11 is set so as to pass through the center of a lens of the photographic device 13. More concretely, a relation between the still image camera 32 and the video camera 33 and the shaft 11 will be set in such a manner that the optical axis of at least the still image camera 32 out of the still image camera 32 and the video camera 33 will be coincident with the axis of the shaft 11.

Further, reference position (a position to receive signals) of the GPS antenna 12 and reference position (e.g. the center of a photodetection element) of each of the still image camera 32 and the video camera 33 are in a relation already known. Also, a relation between the reference position of the GPS antenna 12 and the reference positions of the still image camera 32 and the video camera 33 may be set as already known according to the mechanical positional relation between the GPS antenna 12 and the still image camera 32 and the video camera 33 when the camera for photogrammetry 2 is manufactured, or the image is acquired after the manufacture, and positional relation may be set as a relation already known from the image.

In the storage unit 22, a program storage unit and a data storage unit are prepared. In the program storage unit, the following programs are stored: an image pickup program for controlling image pickup of the still image camera 32 and the video camera 33, a flight control program for controlling driving of the propeller motor 5 and for performing autonomous flight, a communication program for transmitting an acquired data to a remote control device (not shown) and for receiving flight instruction or the like from the remote control device, a data processing program for processing and storing the data acquired at the image pickup unit 24, a flight planning program, a reaching time judging program for judging whether a position measured by a GPS device 25' (to be described later) has reached within a waypoint area or not, and other programs.

In the data storage unit, the following data are stored: image data acquired at the image pickup unit 24, absolute coordinates and time signals obtained by the GPS antenna 12 and the GPS receiver 25, still image data acquired by the still image camera 32, a video data acquired by the video camera 33, and the like. The GPS antenna 12 and the GPS receiver 25 make up together a GPS device with high accuracy. Hereinafter, the GPS antenna 12 and the GPS receiver 25 are referred together as a GPS device 25'.

The control arithmetic unit 20 carries out the control necessary for the flight and the acquisition of images according to programs stored in the storage unit 22.

The image pickup control unit 23 carries out controls concerning image pickup of the still image camera 32 and the video camera 33. For instance, the synchronous control of the still image camera and the video camera 33, and the control of shutter timing of the still image camera 32 are carried out. The still image camera 32 can pick up a still image by the image pickup control unit 23 at any arbitrary time, and the still image camera 32 and the video camera 33 carry out the synchronous control based on a clock signal issued from the clock signal generating unit 21. Further, the image pickup control unit 23 controls the time of acquiring a still image based on a shutter command signal as transmitted from the base control device 41. It is to be noted that clocks of each of the UAV's are synchronized in advance. Or, the clock signal generating unit 21 generates clock signals based on a GPS time.

The GPS device 25' measures absolute coordinates of the UAV 1 with high accuracy and issues time (GPS time) included in the receiving signal from the satellite 38. It is to be noted that as the GPS device 25' with high accuracy, it is preferable to use a post-processing kinematic or a real time kinematic GPS (RTK-GPS). The RTK-GPS can carry out measurement with high accuracy, and measurement accuracy of the RTK-GPS is several centimeters on ground surface.

The magnetic compass 27 and the gyro unit 28 are mounted on the main frame 7. The magnetic compass 27 detects the direction of the UAV 1, and the gyro unit 28 detects the posture of the UAV 1 in a flying condition.

The wireless communication unit 29 transmits the GPS time received by the GPS device 25' to the base control device 41 in real time. Further, the wireless communication unit 29 receives information for flight control from the base control device 41 or receives information about photographing points (waypoints) which are set up along the flight course, or information such as image pickup conditions for acquiring still images. Also, a control signal is received in a case where the flight of the UAV 1 is remotely controlled by a wireless maneuvering unit (not shown).

The waypoint processing unit 30 sets up a waypoint setting information (to be described later) transmitted from the base control device 41, i.e. sets up coordinates of a waypoint as set on the flight course, and the waypoint processing unit make the storage unit 22 to store a waypoint area thus set up. Also, the next waypoint to acquire a still image is read sequentially from the storage unit 22 and transmitted to the control arithmetic unit 20. Further, concerning the waypoint where acquisition of the still image has been completed, a record of still image acquisition is added. The waypoint processing unit 30 manages in such a manner that still images can be acquired at all of the waypoints and that the still images are not overlapped on each other. It is to be noted that the waypoint processing unit 30 may be provided on the base control device 41.

The waypoint reaching time acquiring unit 31 sets up a predetermined range as a photographing point area (a waypoint area) around the waypoint as a center, and judges whether the UAV 1 has entered the waypoint area or not based on the position data obtained by the GPS device 25'. Further, in a case where the waypoint reaching time acquiring unit 31 judges that the UAV 1 has entered the waypoint area, and acquires the time of entry (waypoint reaching time) from the GPS device 25', and transmits the waypoint reaching time thus acquired to the base control device 41 via the wireless communication unit 29.

Figure 5:
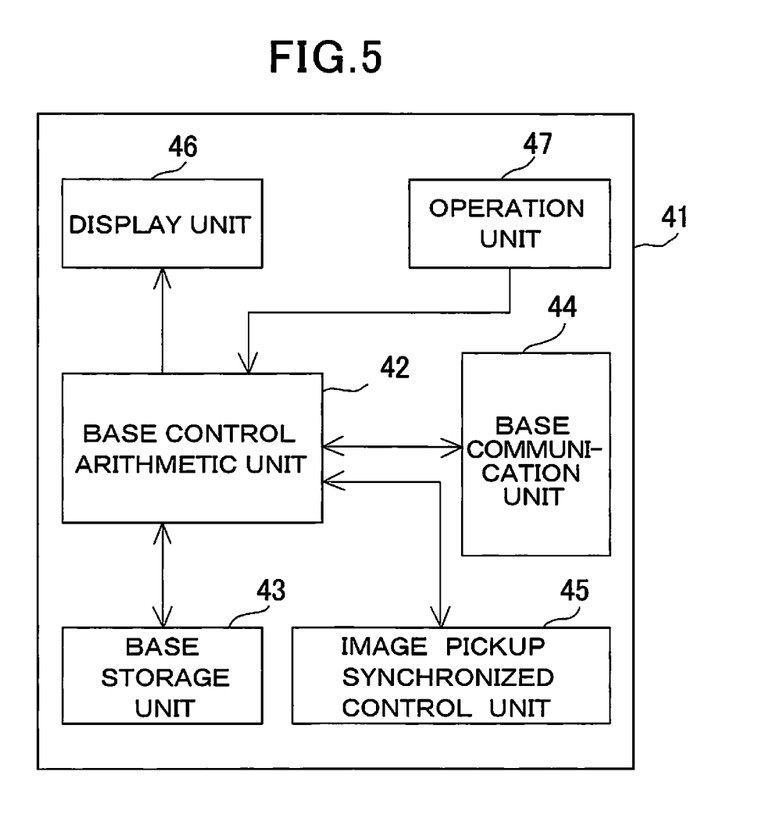
FIG. 5 is a block diagram to show the schematics of a base control device.

Next, by referring to FIG. 5, description will be given on the schematics of the base control device 41.

The base control device 41 has a base control arithmetic unit 42, a base storage unit 43, a base communication unit 44, an image pickup synchronization control unit 45, a display unit 46, an operation unit 47, and the like. It is to be noted that the base control device 41 may be a device manufactured for the present embodiment, or a general purpose PC or the like may be used. Further, the image pickup synchronization control unit 45 is made up together by the base control arithmetic unit 42, image pickup synchronization control programs to be described later, and the like.

The base storage unit 43 has a program storage region and a data storage region, and in the program storage region the following programs are stored: a communication program for communicating with the UAV 1, a program for setting up a flight plan in the photographing device 13, an image pickup synchronization control program for setting up a waypoint (a photographing point) on a flight course of the UAV 1, and other programs. Further, data such as an image data, a coordinate data of the photographing point, and time data at the photographing point are stored in the data storage region.

The base communication unit 44 receives the data transmitted from the UAV 1 and transmits an information for flight control, or an information concerning the photographing point, an information about image pickup condition or the like for acquiring still images, and further, an information relating to timing of acquiring still images.

Figure 6:
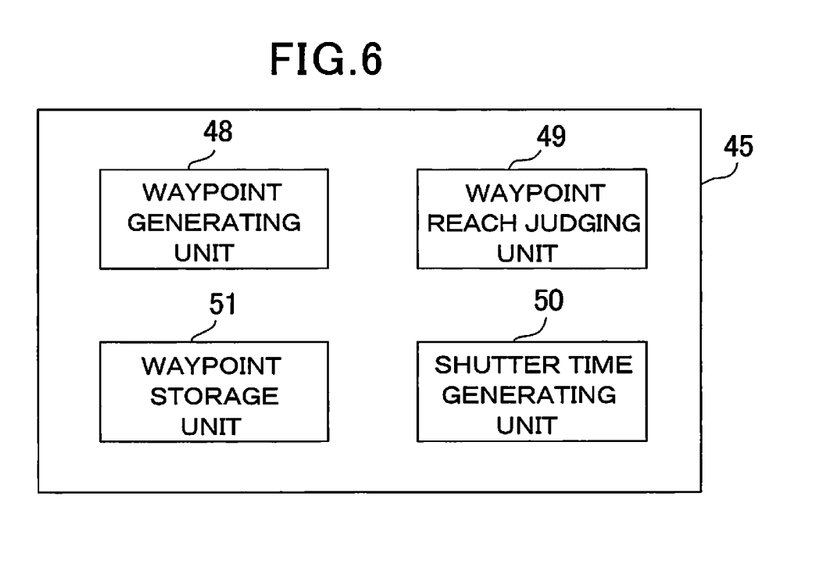
FIG. 6 is a schematical block diagram of an image pickup synchronization control unit installed on the base control device.

Referring to FIG. 6, description will be given on the image pickup synchronization control unit 45.

The image pickup synchronization control unit 45 has a waypoint generating unit 48, a waypoint reach judging unit 49, a shutter time generating unit 50, and a waypoint storage unit 51. Each of the waypoint generating unit 48, the waypoint reach judging unit 49, and the shutter time generating unit 50 are operated according to the image pickup synchronization control program. It is to be noted that the waypoint storage unit 51 may be assigned a part of the base storage unit 43.

The waypoint generating unit 48 calculates a photographing point (a coordinate value) based on the measurement range as set up and the flight plan or the like and generates a photographing point as a waypoint on a flight course as set up by a flight plan. Further, a distance B (base line length) between waypoints is set up so to be ⅓ or more of a flying height H, and in a case where photographing is performed on the waypoints adjacent to each other, the images adjacent to each other are set up so to overlap each other by at least 60% or more.

Waypoint reaching time is transmitted via the wireless communication unit 29 from the waypoint reaching time acquiring unit 31. Further, waypoint reaching time as received via the base communication unit 44 is transmitted to the waypoint reach judging unit 49. When the waypoint reach judging unit 49 acquires the waypoint reaching time from all of the UAV's 1, it is judged that all of the UAV's 1 have reached the waypoint, and based on the result of the judgment, the waypoint reaching time acquired at the latest is inputted to the shutter time generating unit 50.

The shutter time generating unit 50 calculates the shutter time for the still image camera 32 to acquire the still image based on the last waypoint reaching time from the waypoint reach judging unit 49. That is, the time after a predetermined time from the last waypoint reaching time is calculated as a shutter time. The shutter time thus calculated is transmitted to the UAV 1 by the base communication unit 44 as an image pickup command.

Information relating to the waypoint such as coordinates of the waypoint generated and image pickup time of still images at the waypoint are stored in the waypoint storage unit 51.

First, description will be given on the operation of the UAV 1 alone.

In a case where the flight of the UAV 1 is to be controlled, the driving of propellers is controlled by setting two propeller motors 5 as one set. For instance, by setting propeller motors 5a and 5b, propeller motors 5c and 5d, propeller motors 5e and 5f, and propeller motors 5g and 5h as one set respectively, and rotation driving of each of propellers 6a and 6b, propellers 6c and 6d, propellers 6e and 6f, and propellers 6g and 6h are individually controlled.

For instance, if the propeller motors 5a to 5h are evenly driven and if the thrust force caused by rotation of the propellers 6a to 6h are controlled in the same manner, the UAV 1 flies upward in vertical direction.

Figure 7:
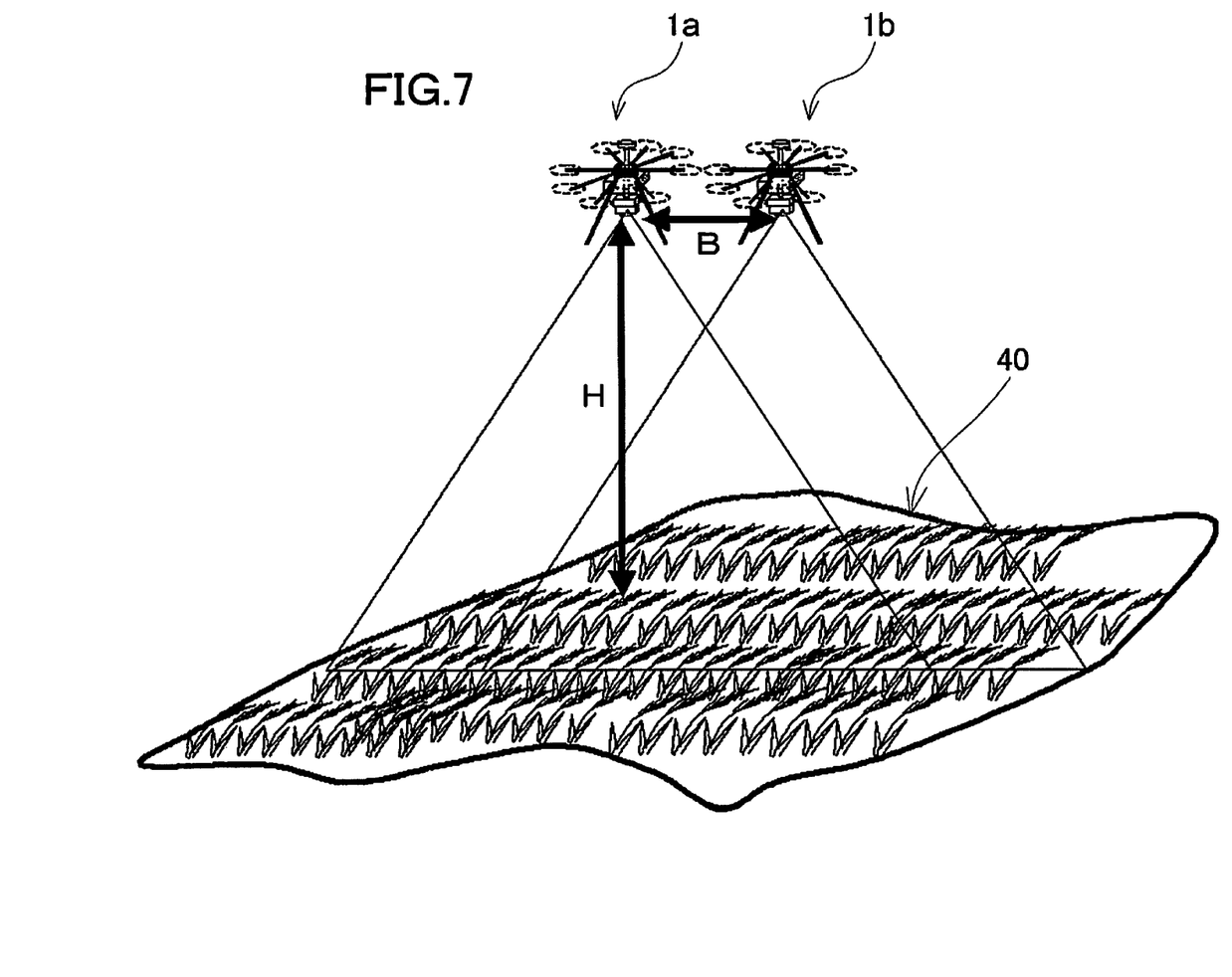
FIG. 7 is a drawing to explain a condition where photographing is performed by synchronized control from two flying vehicles.

Next, by referring to FIG. 7 and FIG. 8, description will be given on a case where photographing is performed by using two UAV's 1a and 1b.

A flight plan is set up for each of the UAV 1a and the UAV 1b. The flight plan, for instance, is planned in such a manner that each of the UAV 1a and the UAV 1b carries out photographing over a range to be measured 40 at a flight course as set up, at a flying height as set up, at a flying speed as set up, and also at a predetermined interval. Further, it is planned in such a manner that the UAV 1a and the UAV 1b fly by maintaining a predetermined distance between them, and the like.

For instance, it is set up in such a manner that a distance between the UAV 1a and the UAV 1b is B with respect to a flying height H, where B≥H/3, and that the overlapping ratio between the images photographed by the UAV 1a and the UAV 1b will be 60% or more.

In the present embodiment, the images photographed by the UAV 1a and by the UAV 1b are matched each other and photogrammetry is performed according to images matched as stereo-images. In this case, the distance B between the UAV 1a and UAV 1b will be the base line length. Further, in a case where the photographing is performed at a low altitude, changes over time of the condition of the object to be measured are remarkably reflected on the image.

Figure 8A:
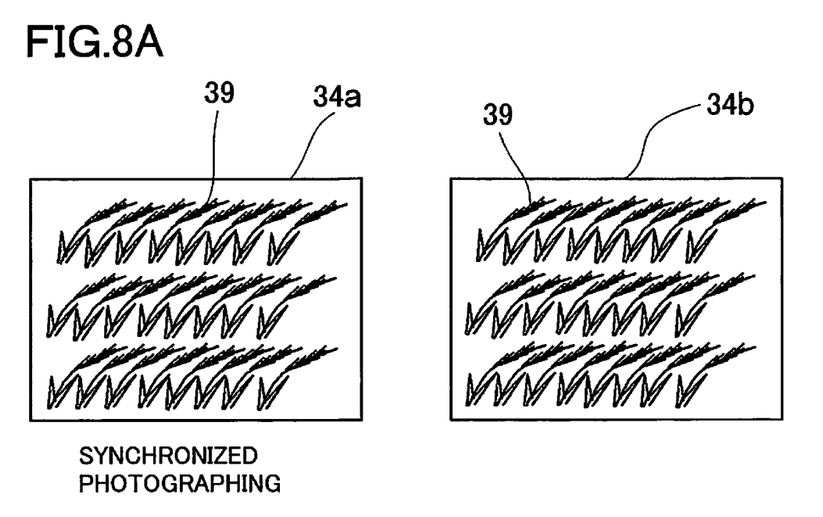
FIG. 8A shows the cases where images are photographed by synchronized control.

For instance, in a case where agricultural products such as rice plant, wheat, etc. is an object to be measured 39 and images are acquired by the UAV 1a and UAV 1b at the same moment, the photographed images as shown in FIG. 8A, there is no difference on the images between a left image 34a acquired by the UAV 1a and a right image 34b acquired by the UAV 1b because there is no conditional change over time in the object to be measured 39.

To the contrary, in a case where there is time difference when the UAV 1a and the UAV 1b acquire images, there is a possibility that changes may occur in the condition of the object to be measured 39. For instance, when a left image 34a is acquired in FIG. 8B and the wind blows from the right, and when a right image 34b is acquired in FIG. 8B where wind direction is changed and the wind blows from the left, the condition of the object to be measured 39 is changed corresponding to the change of wind direction. As shown in the figure, the object to be measured 39 is tilted toward the left side in the left image 34a, while the object to be measured 39 is tilted toward the right side in the right image 34b.

Figure 8B:
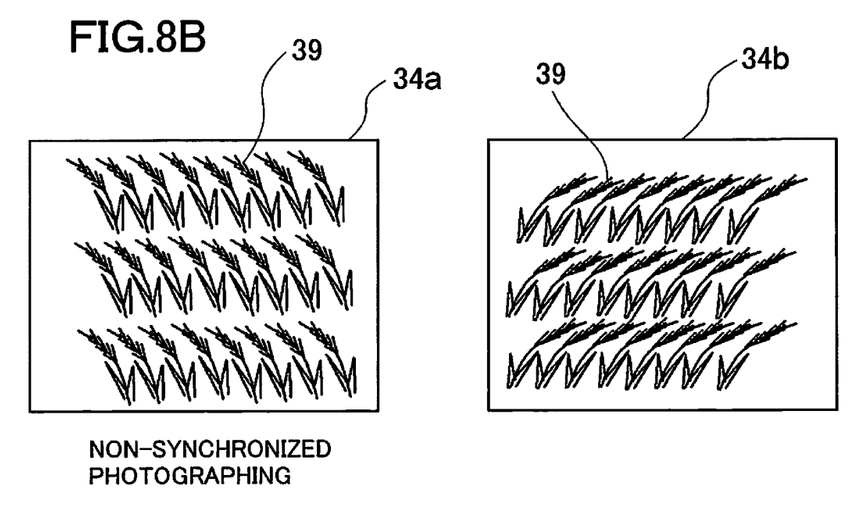
FIG. 8B shows the cases where images are photographed by non-synchronized control.

In a case where there are substantial changes between the images as in the case of the left image 34a and the right image 34b of FIG. 8B, relative orientation cannot be performed between both the images, or the accuracy of relative orientation is decreased.

In the present embodiment, synchronous control is performed so that photographing is carried out at the same moment concerning the photographing between the UAV 1a and the UAV 1b.

Description will be given below on synchronous control.

In a case where the flight plan is set up, setting is also performed on positions of the photographing points (coordinate values) when still images are photographed for the UAV 1a and the UAV 1b respectively. Also, a waypoint area is set up with the photographing point as the center. The waypoint area is set up with a radius R by regarding the photographing point as the center, and the extent of the waypoint area is set in such a manner that error may not cause trouble when relative orientation is carried out on the images photographed by the UAV 1 and the UAV 1b.

The UAV 1a and the UAV 1b stores positional information of the waypoint, and judges whether the UAV 1a and the UAV 1b have reached the photographing point or not based on the positional information of the waypoint and the positional information of the GPS device 25' respectively. That is, the coordinate values of the UAV 1a and the UAV 1b themselves judge whether the UAV's 1a and 1b are within the waypoint area or not. Also, each of the UAV 1a and the UAV 1b transmits the GPS time at the moment when the UAV 1a and the UAV 1b enter the waypoint area to the base control device 41.

It is difficult that the UAV 1a and the UAV 1b reach the photographing points at the same moment respectively, because of the factors such as speed difference between the UAV 1a and the UAV 1b, influence of the wind, etc. Therefore, the UAV 1 reaching the photographing point first maintains itself (the UAV 1) at the position of the photographing point by hovering and waits until the other UAV 1 reaches the photographing point. Based on the GPS time as transmitted from both of the UAV's 1, the base control device 41 judges that both of the UAV's 1 have reached the photographing points respectively. Then, based on the last GPS time, a photographing time to acquire the still images at the same time by the photographing unit 24 of the UAV 1a and the UAV 1b is obtained. The photographing time thus obtained is transmitted to each of the control devices 19 of the UAV 1a and the UAV 1b from the base control device 41 as a shutter timing signal.

The image pickup control unit 23 of each control device 19 produces a shutter command based on the shutter timing signal and operates the image pickup unit 24 based on the shutter command, and a still image at the photographing point is acquired at the image pickup time. That is, both the image pickup units 24 are synchronously controlled so that the still image is acquired at the image pickup time.

Figure 9:
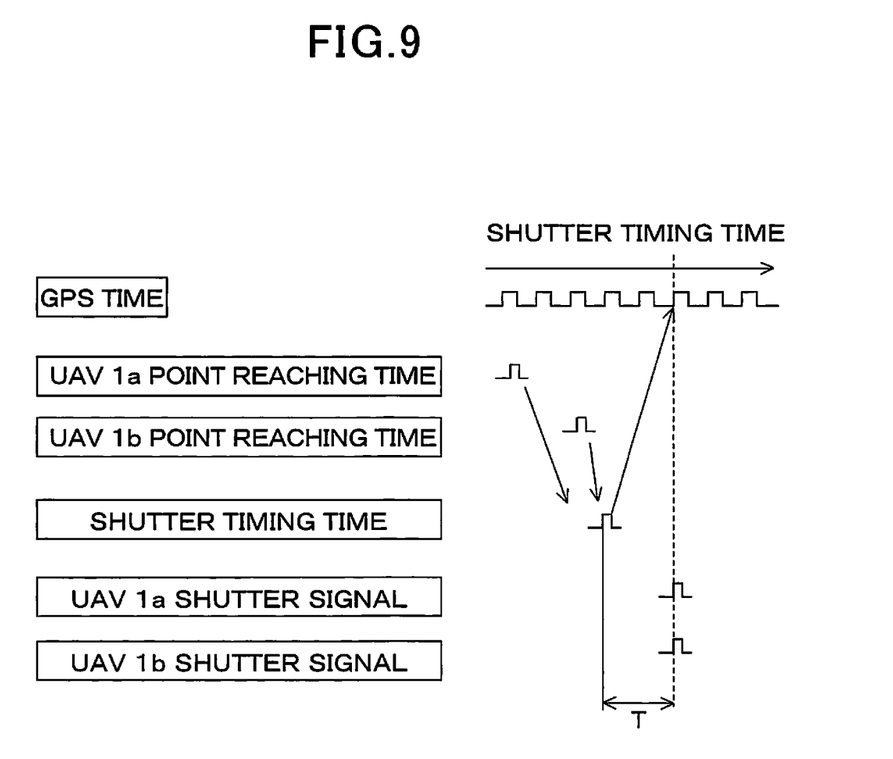
FIG. 9 is a timing chart in a case where the photographing is performed by synchronized control.

Further, more concrete description will be given by referring to FIG. 9.

For instance, when the UAV 1a reaches the waypoint area first, waypoint reaching time is acquired from the GPS device 25' of the UAV 1a. The UAV 1a starts hovering at the position. Under the hovering condition, the direction of the UAV 1a is detected by the magnetic compass 27, and based on the detection result of the magnetic compass 27, the direction of the UAV 1a is maintained in the predetermined direction. Further, when it is judged that the UAV 1b has reached the waypoint area, the waypoint reaching time is acquired from the GPS device 25' of the UAV 1b at that moment.

Based on the last waypoint reaching time thus obtained, i.e. based on the waypoint reaching time of the UAV 1b, a shutter timing time is calculated. Further, the shutter timing time is estimated to be after a predetermined time after the reaching moment acquired. This predetermined time is determined by taking the following factors into account: communication delay between the base control device 41 and each of the UAV's 1a and 1b, delay of the signal processing in a communication circuit, etc.

When the shutter timing time is determined, the shutter timing time is transmitted to the UAV 1a and the UAV 1b respectively. Each of the image pickup control unit 23 acquires a still image by each of the still image cameras 32 at the moment when the GPS time obtained from the GPS device 25' reaches the shutter timing time.

In the description as given above, it is described that photographing operations by the UAV 1a and by the UAV 1b are synchronously controlled via the base control device 41. However, synchronous control may be directly performed between the UAV 1a and the UAV 1b.

In this case, the image pickup synchronization control unit 45 is provided on the control device 19 of either one of the UAV 1a and the UAV 1b, and data communication can be performed to and from either one of the UAV 1a or the UAV 1b.

For instance, in a case where the waypoint is generated at one of the UAV 1a or the UAV 1b according to the flight plan and both of the UAV 1a and the UAV 1b reach the waypoint area, the waypoint reaching time is acquired, the shutter timing time is calculated according to the waypoint reaching time, and the shutter timing moment is transmitted to the other of the UAV's 1. When the GPS time obtained from the GPS device 25' reaches the shutter timing moment, both the UAV 1a and the UAV 1b acquire still images by each of the still image cameras 32.

Image matching is carried out on a portion where the still images are overlapped on each other, and relative orientation is performed with respect to two still images by image matching. Further, based on the measurement results of two photographing points by the GPS device 25', absolute orientation is performed with respect to the stereo images, and a 3D model is prepared. As for the matching between the images, the least square matching: LSM is used, for instance.

The image matching is described, for instance, in the Japanese Patent Publication JP-A-2008-76303.

Based on the 3D model thus prepared, 3D image of agricultural products can be obtained, and growing height of agricultural products, size of the fruit, etc. can be measured.

It is to be noted that, in the embodiment as described above, shutter timing is determined according to the GPS time, while the shutter timing may be determined according to an internal clock signal of the control devices 19 of the UAV 1a and the UAV 1b.

That is, when the base control device 41 receives a signal to inform that the UAV 1a and the UAV 1b have reached the photographing point, a shutter command signal is issued according to the last receiving signal, and the UAV 1a and the UAV 1b perform photographing after a predetermined clock number when the shutter command signals have been received respectively.

In the embodiment as given above, description is given on a case where synchronous control of photographing is performed with respect to two UAV's 1, while it is needless to say that synchronous control of photographing can be performed likewise on three or more UAV's.

For instance, flight courses are set up for each of three UAV's 1 respectively, and a waypoint and a waypoint area are set up for each of the flight courses. When the three UAV's 1 reach the waypoint areas respectively, the last reaching time of the UAV's 1 is acquired. A moment after elapse of predetermined time from the last reaching time is set up as a shutter timing time, and it may be so arranged that images are taken at the same time by three UAV's 1 at the shutter timing time.

Figure 10:
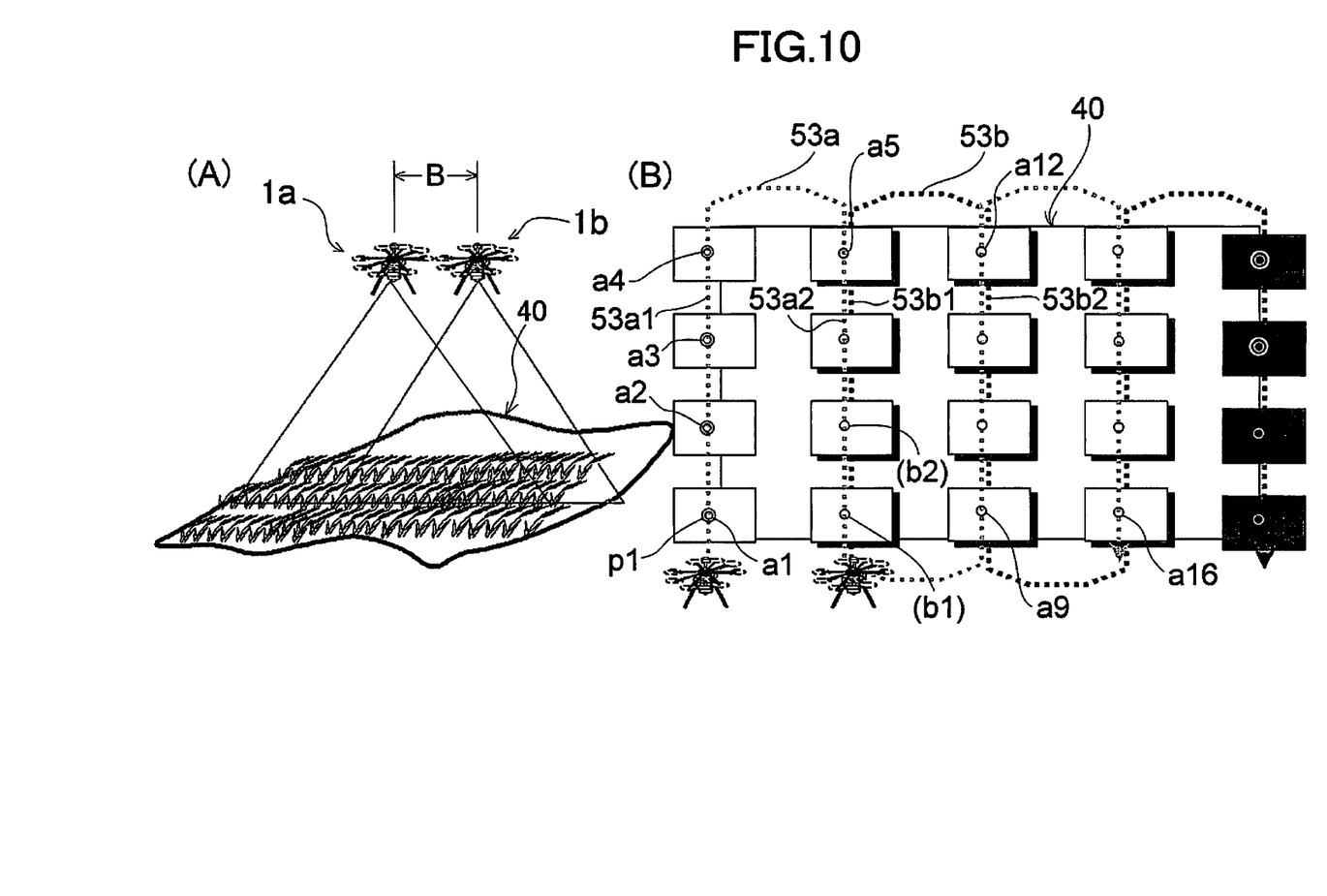
FIG. 10A is a drawing to explain and show a relation of flying vehicles in a case where an object to be measured in wide range is photographed by two flying vehicles.
FIG. 10B is a drawing to explain and show an example of flight courses of two flying vehicles.

Next, by referring to FIG. 10, description will be given on a case where a plurality of photographing points are set upon the flight course and a 3D model to cover an extensive range to be measured 40 is prepared. Further, FIG. 10 shows a case where there are two UAV's 1, and the two UAV's 1a and 1b fly by keeping a distance of B between them as shown in FIG. 10A.

When the range to be measured 40 is set, flight courses 53a and 53b are set up for each of the UAV 1a and the UAV 1b respectively with respect to the range to be measured 40.

The flight course 53a alternately repeat an outward flight and a return flight to come back, and set up for the entire area of the range to be measured 40. The interval between the outward route 53a1 and the return route 53a2 are determined by a field angle of the image pickup unit 24 and a flying altitude, and set so that a sidelapping ratio between the images acquired on the outward route 53a1 and the images acquired on the return route 53a2 will be 30% or more.

The flight course 53b, similar to the flight course 53a, alternately repeat an outward flight and a return flight to come back, set up for the entire area of the range to be measured 40, and it is arranged in such a manner that the flight course 53b runs in parallel to the flight course 53a and to keep a distance B between them. The distance B is set so that an overlapping ratio between the images acquired along the flight course 53a and the images acquired on the flight course 53b will be 60% or more.

Photographing points a1, a2, a3, . . . , an are set up along the flight course 53a at a predetermined interval, and photographing points b1, b2, b3, . . . , bn are set up along the flight course 53b to correspond to the photographing points a1, a2, a3, . . . , an. For instance, a stereo image is prepared by an image acquired at the photographing point a1 and an image acquired at the photographing point b1.

The sidelapping ratio of the two images acquired at the photographing point a1 and the photographing point a2 is set to 30% or higher, for instance.

When the photographing points a1, a2, a3, . . . , an and the photographing points b1, b2, b3, . . . , bn have been set up, photographing point areas p1, p2, p3, . . . , pn are set up with respect to each of the photographing points a1, a2, a3, . . . , an respectively, and photographing point areas q1, q2, q3, . . . , qn are set up with respect to each of the photographing points b1, b2, b3, . . . , bn respectively.

It is to be noted that concerning the photographing points b1, b2, b3, . . . , bn and the photographing point areas q1, q2, q3, . . . , qn, those overlapping with the photographing points a1, a2, a3, . . . , an and the photographing point areas p1, p2, p3, . . . , pn are not shown in the figure.

When the UAV 1a and the UAV 1b start the flight, and the UAV 1a reaches the photographing point area p1 first, for instance, the UAV 1a starts hovering and keeps the position of the photographing point area p1. When the UAV 1b reaches the photographing point area q1, based on the position signals from the UAV 1a and the UAV 1b, it is confirmed that the UAV 1a and the UAV 1b are positioned at the photographing areas p1 and q1 respectively, and still images are acquired at the same time at the photographing points a1 and b1 by synchronized control as described above.

Still images and position data of the moment when the still image has been acquired are transmitted to the base control device 41 (see FIG. 1). At the base control device 41, matching (relative orientation) of the still images acquired at the photographing points a1 and b1 is performed, and a 3D model is prepared according to the positional data at the time of photographing.

Next, the UAV 1a and the UAV 1b move to the photographing point a2 and the photographing point b2 respectively. Similarly, by regarding the images acquired at the photographing points a2 and b2 as a pair of images, a 3D model is prepared according to the two images.

Further, still images are acquired sequentially at photographing points am and bm along the return courses 53a2 and 53b2, and a 3D model is prepared in the same manner.

As a result, still images are acquired sequentially at the photographing points a1, a2, a3, . . . , an and at the photographing points b1, b2, b3, . . . , bn, and a 3D model is prepared based on the two images acquired at the photographing points, which becomes a pair respectively.

Further, the images acquired at the photographing points a1 and b1 and the images acquired at the photographing points a2 and b2 have a sidelapping ratio of 30%, and the images acquired on the outward course and the images acquired on the return course also have a sidelapping ratio of 30%. Therefore, the 3D model thus prepared can be connected by using the sidelapping portions. That is, a feature point (tie point) common to each other is extracted at the sidelapping portion, and the 3D models adjacent to each other can be connected according to the tie points. As a result, a wide range 3D model to cover the entire range to be measured 40 can be prepared.

The invention claimed is:

1. An aerial photogrammetry by using two or more flying vehicles each equipped with a GPS device and an image pickup unit, comprising:
   setting up flight courses for each respective flying vehicle,
   setting up two or more photographing points on each respective flight course, and
   setting up a photographing point area respectively with each of the photographing points as the center,
   making the two or more said flying vehicles fly by maintaining a predetermined distance between them,
   measuring a position of each of said flying vehicles by said GPS device,
   after each of said flying vehicles reaches each corresponding photographing point area, maintaining the position of each of said flying vehicles in said photographing point area until all of said flying vehicles have reached said photographing point area, acquiring a time when the last of said flying vehicles finally reaches said photographing point area,
   setting up a shutter timing time after a predetermined time from the moment when the last of said flying vehicles has finally reached said photographing point area, and
   taking aerial photographs by synchronizing two or more of said flying vehicles at said shutter timing time.

2. An aerial photogrammetry according to claim 1, wherein a base control device is installed on ground surface side, said two or more flying vehicles determine whether said two or more flying vehicles have reached within said photographing point area based on positions of said two or more flying vehicles as measured by said GPS device, a reaching time is acquired by said GPS device, a GPS time as acquired is transmitted to said base control device, said base control device calculates a shutter timing time according to the GPS time finally received from said two or more flying vehicles, and in a case where the GPS time acquired by said GPS device coincides with said shutter timing moment, an aerial photograph is taken by said two or more flying vehicles.

3. An aerial photogrammetry according to claim 2, wherein a distance between said photographing points is ⅓ or more of an altitude, and said photographing point is set up so that overlapping ratio between the images taken will be 60% or more at said altitude.

4. An aerial photogrammetry according to claim 1, wherein a distance between said photographing points is ⅓ or more of an altitude, and said photographing point is set up so that overlapping ratio between the images taken will be 60% or more at said altitude.

5. An aerial photogrammetry according to claim 1, wherein said two or more flying vehicles take still images while flying along a flight course as set up for each of the flying vehicles, two or more photographing points are set up along said flight course, a distance between said photographing points is set so that still images acquired at each of the photographing points will be at least 30% of a sidelap, a 3D model prepared is connected by tie points extracted by sidelapping, and a wide-area 3D model is prepared.

6. An aerial photogrammetric system, comprising:
two or more flying vehicles each equipped with an image pickup unit, a GPS device, a flying vehicle control device, and
a base control device which is installed on ground surface side for setting up a flight course for each respective flying vehicle and for setting up photographing points of said two or more flying vehicles on each of the respective flight courses at a predetermined distance and for setting photographing points area with said photographing point as the center,
wherein said flying vehicle control device makes two or more flying vehicles fly by maintaining a predetermined distance and makes the flying vehicles fly in said respective corresponding photographing point area based on the position of the flying vehicle measured by said GPS device, maintains said flying vehicles within said photographing point area in a case where said photographing point area is reached, further, transmits time of said GPS device to said base control device, said base control device judges a time point of when the positions of said two or more flying vehicles are finally within said photographing point area in a case where positions of all of said two or more flying vehicles are within said photographing point area, transmits a time after elapse of a predetermined time from said time point to each of said flying vehicle control devices as a shutter timing time, and said image pickup unit takes images at said shutter timing time.

7. An aerial photogrammetric system according to claim 6, wherein said flying vehicle control device transmits position information and GPS time as acquired by said GPS device to said base control device, said base control device determines said GPS time of when the last of said two or more flying vehicles reaches said photographing point area based on said positional information and said GPS time, transmits a time after predetermined time from said GPS time as said shutter timing time to said flying vehicle control device, and said flying vehicle control device makes said image pickup unit to carry out taking images when said GPS time obtained from said GPS device coincides with said shutter timing time.

8. An aerial photogrammetric system according to claim 7, wherein said flying vehicle control device makes each of said flying vehicles fly along a flight course as set up for each of the flying vehicles, a predetermined number of photographing points are set up on each of said flight courses, and in a case where still images are acquired at corresponding photographing points on each of the flight courses, said flying vehicle control device makes said image pickup unit take images at said shutter timing time.

9. An aerial photogrammetric system according to claim 6, wherein said flying vehicle control device makes each of said flying vehicles fly along a flight course as set up for each of the flying vehicles, a predetermined number of photographing points are set up on each of said flight courses, and in a case where still images are acquired at corresponding photographing points on each of the flight courses, said flying vehicle control device makes said image pickup unit take images at said shutter timing time.

* * * * *